Jan. 19, 1965   H. E. DE BUHR   3,166,204
BALE HANDLING APPARATUS
Original Filed Dec. 7, 1959   2 Sheets-Sheet 1

*INVENTOR.*
H. E. DE BUHR

Jan. 19, 1965    H. E. DE BUHR    3,166,204
BALE HANDLING APPARATUS
Original Filed Dec. 7, 1959    2 Sheets-Sheet 2

INVENTOR.
H. E. DE BUHR 3,166,204
BALE HANDLING APPARATUS
Harold E. de Buhr, Ottumwa, Iowa, assignor to Deere & Company, Moline, Ill., a corporation of Delaware
Continuation of application Ser. No. 857,588, Dec. 7, 1959. This application Dec. 3, 1962, Ser. No. 242,347
5 Claims. (Cl. 214—42)

This invention relates to bale-handling mechanism as employed in the handling of bales formed and discharged by an agricultural baler to a trailing or otherwise associated wagon or receiving vehicle.

This application is a continuation of application Ser. No. 857,588, filed December 7, 1959, now abandoned.

The typical agricultural baler, drawn over a field by a tractor or other draft vehicle, picks up previously harvested crops, such as hay, and delivers this crop to a bale chamber in which a plunger or other mechanism operates to form successive bales of predetermined size, weight, etc. Automatic tying mechanism included in the baler is effective to tie the bales with twine or wire. Each bale when formed serves as a header for a following bale and ultimately the bale first formed is ejected or discharged at the rear end of the bale case, in those cases in which the bale case extends fore-and-aft along the line of advance. Until the recent past, the discharged bales were allowed to fall onto the ground and were subsequently picked up, either manually or by special machines. However, with the development of the automatic bale thrower, a typical example of which is disclosed in the U.S. patent to Morrison 2,756,865, the entire baling operation has been improved and rendered substantially completely automatic.

As disclosed in the patent identified above, the bale thrower is mounted at the rear or discharge end of the bale case and receives the individual bales in succession and delivers them rearwardly in a trajectory such that the bales are literally thrown to the trailing wagon. One problem, however, that arises in the operation of a vehicular train made up of a tractor, baler, bale thrower and wagon, is that when the train departs from straight-ahead travel, the bale thrower and wagon often become so laterally misalined that the thrown bale will miss the wagon. According to the present invention, the bale thrower may shift laterally to compensate for deviation from straight-ahead travel so that even though the wagon and baler become misalined, the bale thrower will change its path of delivery so as to assure transfer of the thrown bale to the wagon. Accordingly, it is a principal object of the invention to provide an improved bale thrower of the character indicated. A further and important object is to arrange the bale thrower in such manner that its lateral shifting is made responsive automatically to changes in the train in which the baler or wagon departs from straight-ahead travel. A further object of the invention resides in power-operated means for causing the bale thrower to shift. Further objects reside in improved control means, preferably incorporating follow-up means, so that the lateral shifting of the thrower is proportionate to lateral shifting or deviation of the wagon or trailer, improved means for mounting the thrower on the baler, and improved means in the thrower itself for handling the bales to be thrown.

The foregoing and other important objects and desirable features inherent in and encompassed by the invention will become apparent as preferred embodiments thereof are disclosed in detail in the ensuing specification and accompanying sheets of drawings, the figures of which are described below.

Figure 1:
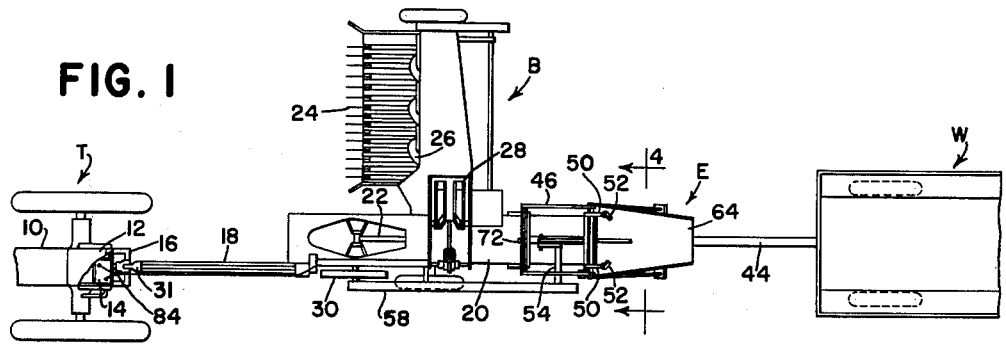
FIG. 1 is a fragmentary plan view, drawn to a reduced scale, showing a typical train made up of a tractor, baler, bale thrower and trailer or wagon.

In the typical vehicular train shown in FIG. 1, a tractor is designated generally by the letter T, a baler by the letter B, a bale thrower by the letter E and a trailing wagon or equivalent vehicle by the letter W.

The tractor T may be of any conventional construction and its normal line of travel is to the left as seen in FIG. 1. The tractor is provided with the usual main body 10 having an operator's seat 12, a portion of which is broken away to expose a source of energy, here an electrical storage battery 14. The tractor has a drawbar 16 to which is connected the forwardly extending tongue 18 of the baler. The baler has bale-forming means in the form of a fore-and-aft bale chamber 20 in which a plunger (not shown) is reciprocated by a pitman 22 to form bales of material delivered thereto by pick-up means 24 located to the right of the baler (as regarded from the standpoint of its normal line of advance). Material picked up by the pick-up means is moved to the left and into the bale chamber 20 by transverse feeder means 26 and 28. These are conventional components of a baler and are illustrated and described only briefly for purposes of orientation. The crank shaft which drives the pitman 22 is equipped externally with a fly wheel 30 and power for driving the moving parts of the baler is derived in the first instance from the tractor via the usual power take-off and propeller shafting 31.

Figure 4:
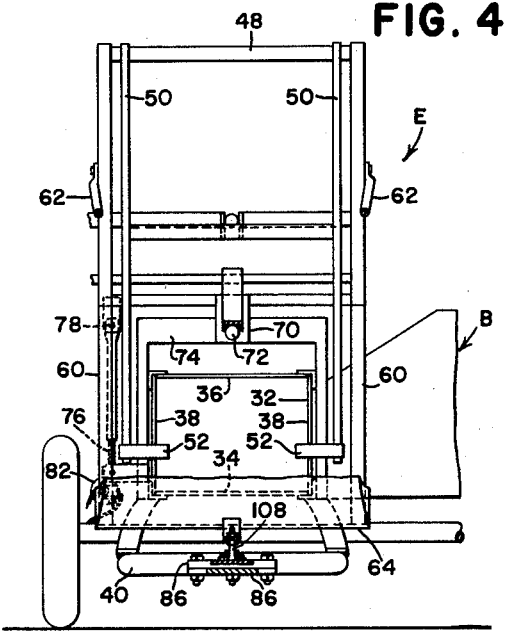
FIG. 4 is a rear elevational view, with portions broken away, as seen generally along the line 4—4 of FIG. 1 and drawn to the scale of FIG. 2.
Figure 6:
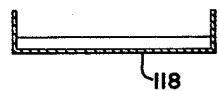
FIG. 6 is a section on the line 6—6 of FIG. 5.

The rear portion of the bale chamber 20 is continued as a bale case extension, here made up of a plurality of walls arranged in rectangular fashion to define a rear discharge opening or portion 32. As best seen in FIG. 4, the bale case extension has a floor 34, a top 36 and opposite upright side wall portions 38.

The rear portion of the baler is equipped with a wagon hitch or drawbar 40 by means of which a pivotal connection on a vertical axis is effected at 42 with a tongue 44 for the wagon or vehicle W. The wagon here may be any conventional farm trailer of the four-wheeled type. As the vehicular train travels ahead in a straight line, the baler will follow in trailing relationship to the tractor and the wagon will trail the baler. The draft connection 40–42–44 is normally effected so that the wagon is in rearward alinement with the bale discharge portion or rear opening 32, and the bale thrower or ejector will normally operate to receive discharged or emerging bales from the bale case 20 and by throwing them directly rearwardly will normally assure transfer of the bales to the wagon.

The bale thrower or ejector chosen for purposes of illustration is generally of the type shown in the Morrison patent noted above and comprises a main support or support means 46 suitably mounted on the baler or othrwise connected into the train (in a manner to be presently described) and having means at its upper end providing a pivot at 48 on an axis transverse to the line of travel. The pivot 48 supports a bale throwing means in the form of a pair of rigidly cross-connected depending throwing arms 50, the lower end of each of which is provided with bale-engaging means, here a suitable bale-gripping device 52. As best seen in FIG. 1, the devices 52 are spaced laterally apart a distance slightly less than the width of an emerging bale so that as the bale emerges, it forces itself between the devices 52, which are shaped to permit rearward travel of the bale relative to the arms 50 but which enable the devices 52 to bite into the bale when the arms are swung rearwardly and upwardly about the axis 48 by means including a crankshaft 54 and pitman 56. The means for driving the crankshaft 54 may be the same as those disclosed in the above-identified Morrison patent. The drive is indicated generally by the numeral 58 as extending from the fly wheel 30 to the crankshaft 54 and is automatically interruptible and energizible, as by a one-revolution clutch so that the arms 50 operate to swing rearwardly and upwardly only when an emerging bale has assumed a predetermined position between the gripping devices 52.

Figure 2:
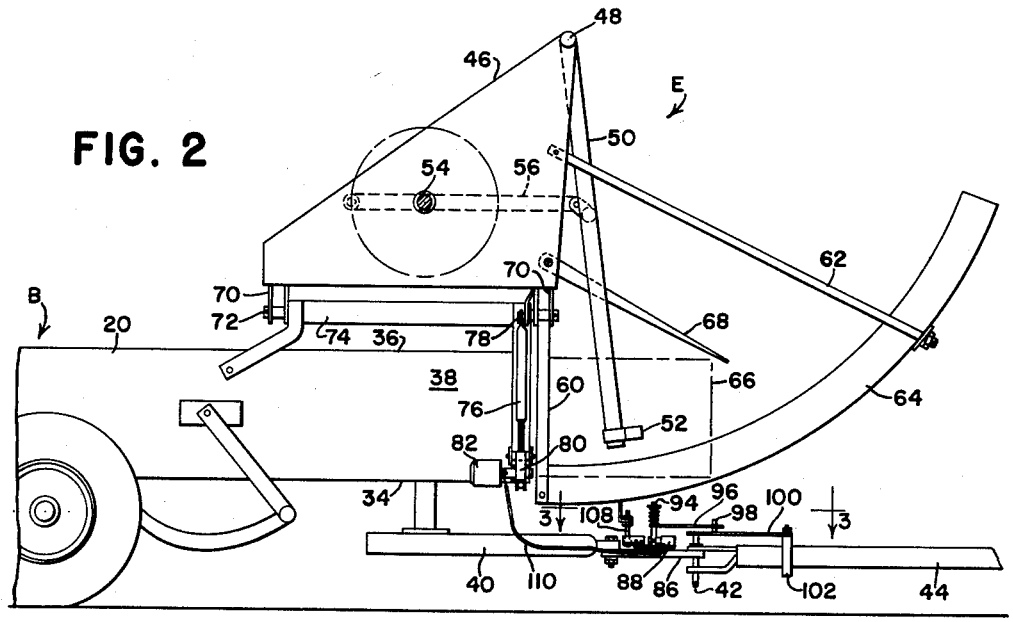
FIG. 2 is a fragmentary side elevation, on a scale enlarged over that of FIG. 1, illustrating the bale thrower and its associated mounting, operating and control mechanism.

The support means or frame 46 includes rigid thereon depending extensions 60 which, together with braces 62, support a receiver, here an arcuate bale chute 64. This chute is concentric about the pivot axis 48 for the throwing arms 50. An emerging bale is shown in broken lines at 66 in FIG. 2 as having emerged to a distance almost enough to energize the bale thrower, which it does by means of actuating a trip arm 68 which trips the one-revolution clutch (not shown) for causing one revolution of the crank-shaft 54. This, through the pitman 56, swings the arms 50 upwardly and rearwardly and then downwardly and forwardly. As the arms reach the upper or rearward end of their stroke, the bale 66 continues rearwardly and is thrown into the wagon W by its momentum. As explained in the Morrison patent, the particular arrangement affords sufficient acceleration of the arms to cause the bale 66 to depart as described. Also, as previously described, the gripping devices 52 are so constructed as to enable the bale to continue its travel rearwardly in a trajectory designed to enable it to enter the wagon.

The foregoing explains the basic operation of a vehicular train equipped with a bale thrower such as that forming the subject of the Morrison patent. As long as the train travels in a straight line, normal functioning can be expected and the bailing operation will be automatic, the baler forming and tying the bales and the thrower E delivering the bales to the wagon W. However, as noted above, the problem that arises in connection with "misses" as respects non-delivery of bales to the wagon on turns has created a need for the improvement set forth here. This improvement involves mounting of the support 46 on the baler in such manner that the entire bale-handling mechanism E may shift laterally about a fore-and-aft axis that lies generally along the line of advance of the train; or, stated otherwise, the axis is generally parallel to the path of emergence of the bales from the bale case. This description fits the situation when the baler has a bale case that extends fore and aft or along the line of travel. It is to be recognized, however, that some balers are constructed with their bale cases transverse to the line of advance and in these cases the principles of the present invention could be employed but it must be observed that the mounting axis may not necessarily be parallel to the bale case. Nevertheless, these are mere details that may be worked out according to particular situations and reference thereto is made only for the purpose of signifying that the invention has wider aspects than the specific characteristics illustrated.

The support means by which the support 46 is mounted on the baler includes a pair of depending ears 70 on the support 46 and received by a fore-and-aft shaft 72 which is in turn carried by suitable supporting structure 74 on the bale case 20 and of inverted U-shape to embrace the bale case from above. The mounting structure 74 is sufficiently long in fore-and-aft dimension to provide adequate support for the bale-handling structure E, the mass of which is substantially equally divided above and below the pivot axis through the shaft 72. In view of the pivotal mounting at 72, the entire apparatus E is capable of lateral swinging from a normal central position as illustrated to lateral positions offset to either side of that central position. Since this involves a slight misalinement between the front of the chute 64 and the rear discharge portion 32 of the bale case, the chute diverges forwardly so that its front or receiving end is of increased width to accommodate misalinement within the ranges expected to be encountered. This will not affect the gripping devices 52, since the bale is inherently flexible or resilient, as are the devices 52, and the bale will readily enter the mechanism in either shifted phase thereof. Considering the situation broadly, the chute 64 and the gripping means 52 may be regarded as receiving means for receiving the emerging bale, as at 66, when it is ejected from the bale case 20.

The improvement includes adjusting means for changing the lateral position of the ejector or bale-handling means E about the axis of the fore-and-aft shaft 72. In the instance illustrated, the adjusting means includes a screw device 76 having one part thereof connected to the support 46, as at 78, and another part thereof driven by appropriate gearing at 80 powered by an electric motor 82. This is, of course, only representative of many means which may be used. The motor 82 is energized from the tractor storage battery 14 as via suitable electrical connections, indicated generally at 84. As will be brought out below, the electrical connections are controlled by switches so that the actuation or energizing of the screw means 76 is made responsive to changes in lateral position between the wagon and the baler. For the immediate present, suffice it to note that when the screw device is rotated in one direction, it will rock the bale-handling mechanism E in one direction, and vice versa. When the device is de-energized, it will hold the position of the bale-handling mechanism.

Figure 3:
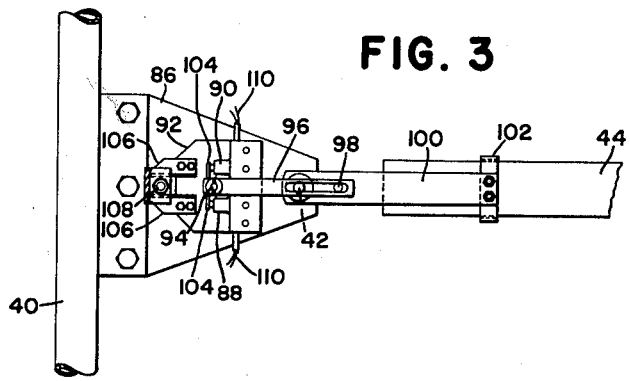
FIG. 3 is an enlarged plan view as seen generally along the line 3—3 of FIG. 2.

The control mechanism for energizing and deenergizing the means 76–82 is responsive to changes in lateral angularity between the wagon and baler as reflected by the wagon tongue 44 and mechanism associated therewith. For this purpose, the baler drawbar 40 has a rearward extension plate 86 via which the clevis pin connection at 42 is made to the tongue 44. This plate carries thereon a pair of electrical switches 88 and 90 appropriately connected into the electrical circuit in such manner as to drive the motor 82 selectively in opposite directions. The switches 88 and 90 are mounted on an intermediate plate 92 which in turn is pivoted on a vertical axis at 94 to the plate 86. The pivot 94, which is effected by a pin, is extended to carry a link 96 which in turn is pivotally connected at 98 to a second link 100 that extends between the top of the clevis pin 42 and a suitable bracket 102 on the tongue 44. The link 96 is suitably slotted as shown in FIG. 3 to accommodate changes in motion and position. The forward end of the link is in the form of a T having opposite arms 104 which selectively activate the switches 88 and 90.

The switch-mounting plate 92 has a forward pair of extensions 106 between which is received a ball-headed member 108 that is in turn rigidly connected to a lower forward portion of the chute 64.

In normal or straight-ahead travel of the train, both switches 88 and 90 are open, because the forward ends 104 of the link 96 are centered when the tongue 44 is trailing directly behind the hitch point 42. When the tractor makes a left turn, for example, it will also cause the baler to turn to the left relative to the wagon W. This will cause the link 96 to swing in a clockwise direction as seen in FIG. 3, effecting closure of the switch 90 while leaving the switch 88 open. The switch 90 is connected into the circuit as by a connecting line 110, which drives the motor 82 in such direction as to shorten the screw device 76, causing lateral shifting of the bottom portion of the ejector means E to the right to compensate for the misalinement of the normal register between the chute or receiving means 64 and the front of the wagon. As the chute 64 shifts to the right as noted, the depending member 108, acting between the extensions 106 on the switch-mounting plate 92, shifts the plate in a clockwise direction about the pivot 94, thus moving the plate relative to the link 96, or in such direction as to cause the switch 90 to move away from the arm 104, resulting in breaking the circuit to the motor so that the motor does not overdrive the mechanism E. In other words, the arrangement provides a conventional type of follow-up so that shifting of the ejector means E is proportional to lateral deviation of the wagon from straight-ahead travel. Just the reverse occurs when turning is to the right.

Figure 5:
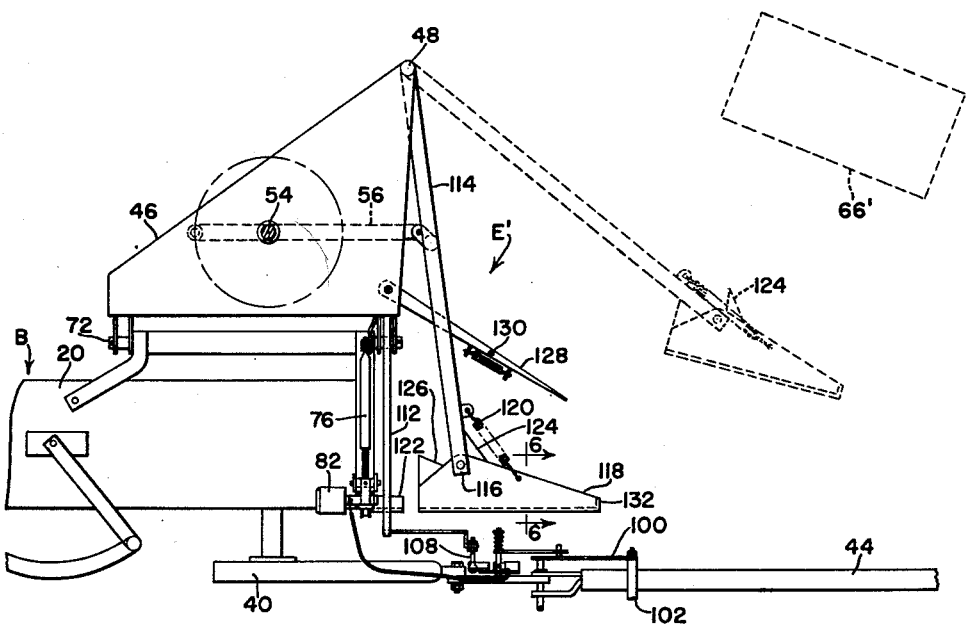
FIG. 5 is a view similar to FIG. 2 but showing a modified form of bale-handling mechanism.

The modified form of bale-handling mechanism, designated E' in FIG. 5, includes a different type of throwing means but incorporates therein the control and adjusting means previously described. Hence, to the extent that the two structures are similar, identical reference characters will be employed without re-description. For example, the support means 46 is mounted on the baler on a fore-and-aft axis via the shaft 72 and the position of the structure is changed by the screw means 76 and electric motor 82 operated by switch means such as those previously described. However, in view of the absence from the structure of FIG. 5 of a chute corresponding to the chute 64 in FIG. 2, the member 108 must be carried by a separate means, which here takes the form of an arm 112 rigidly carried by and depending from the support 46.

The throwing means comprises a pair of depending arms 114 which have their lower portions pivotally connected at 116 on a common transverse axis to a receiving means in the form of a tray or pan 118, the width of which is slightly greater than the width of the discharge opening 32 in the bale case so as to accommodate minor misalinement as the ejector means E' is shifted laterally. The design of the pan 118 is such that a greater portion of its weight is rearwardly of the pivot axis at 116, but biasing means, such as tension springs 120, normally hold the pan in a horizontal position as shown, which is in horizontal alinement with a chute extension 122 on the floor 34 of the bale case. A stop 124 operates between the pan and the lower portion of at least one of the arms to secure the horizontal position which may be overcome by the emergence of a bale onto the pan. The pan then overbalances to the rear and is stopped in that position by a stop 126 which engages between the forward portion of the pan and the associated portion of at least one of the arms 114. This will be clear from the dotted line position of the structure as illustrated, wherein the numeral 66' designates a bale being thrown from the rearwardly swung arms 114, the operation of which depends on the crankshaft 54 and pitman 56 as previously described. In this case, the trip arm 68 is replaced by a trip arm 128 which is of two-piece construction allowing the rear portion of the arm to fold upwardly about a pivot 130 so that when the bale is thrown it does not damage the arm. When the bale emerges from the bale case onto the pan 118, it need not be gripped by gripping devices such as those at 52, since the bale is supported by the pan. A lip 132 at the rear of the pan may be used to prevent the bale from sliding rearwardly off the pan. During operation of the arms 114 to the throwing position illustrated in broken lines, the momentum keeps the bale in place until the end of the throwing stroke is attained, and the bale continues to accelerate beyond the pan until it reaches the wagon.

Features of the invention other than those categorically enumerated will readily occur to those versed in the art, as will many modifications and alterations in the preferred embodiments illustrated and described, all of which may be achieved without departure from the spirit and scope of the invention.

What is claimed is:

1. In combination with a baler having a rear discharge portion from which bales emerge rearwardly as the baler operates, and a trailing vehicle including a bale-catching receptacle rearwardly spaced and relatively remote from said discharge portion and an articulate draft connection to the baler to normally cause the receptacle to trail the baler in a predetermined relationship to said discharge portion during straight-ahead travel of the baler and vehicle but enabling lateral departure of the receptacle from said relationship during deviation of the baler and vehicle from straight-ahead travel: bale handling mechanism disposed closely rearwardly adjacent to said discharge portion and forwardly spaced from the receptacle for receiving a bale from said portion and for throwing such bale upwardly and rearwardly through the air to the receptacle, said mechanism including bale-throwing means normally so aimed at the receptacle during said straight-ahead travel that the trajectory of the bale will be directly to the receptacle; support means exclusive of the receptacle and mounting the mechanism on the baler on a fore-and-aft rocking axis spaced vertically from the throwing means for lateral rocking of the mechanism so as to enable lateral changes in the aiming of the throwing means; adjusting means normally operative between the baler and mechanism for establishing the normal aim of the throwing means during straight-ahead travel; and control means operative on the adjusting means to rock the mechanism about said axis and thereby to correctively change the aim of the throwing means so as to accommodate the trajectory of the thrown bale to the changed position of the receptacle.

2. The invention defined in claim 1, in which: the baler includes a power source; the adjusting means is power operated and is connected to said source; and the control means includes a connection to said adjusting means to energize and de-energize same to respectively change and hold the selected aim of the throwing means.

3. The invention defined in claim 1, including: means on the mechanism for guiding bales to the throwing means during lateral changes in the position of the throwing means.

4. In combination with a baler having a discharge portion from which bales emerge along a defined path as the baler operates, and a trailing vehicle including a bale-catching receptacle spaced and relatively remote from said discharge portion and an articulate draft connection to the baler to normally cause the receptacle to occupy a predetermined relationship to said discharge portion during straight-ahead travel of the baler and vehicle but enabling departure of the receptacle from said relationship during deviation of the baler and vehicle from straight-ahead travel; bale-handling mechanism disposed closely adjacent to said discharge portion and spaced from the receptacle for receiving a bale from said portion and for throwing such bale upwardly and outwardly through the air to the receptacle, said mechanism including bale-throwing means normally so aimed at the receptacle during said straight-ahead travel that the trajectory of the bale will be directly to the receptacle; support means exclusive of the receptacle and mounting the mechanism on the baler on a generally horizontal and fore-and-aft rocking axis spaced vertically from the throwing means for rocking of the mechanism so as to enable changes in the aiming of the throwing means; adjusting means normally operative between the baler and mechanism for establishing the normal aim of the throwing means during straight-ahead travel; and control means operative on the adjusting means to rock the mechanism and thereby to correctively change the aim of the throwing means so as to accommodate the trajectory of the thrown bale to the changed position of the receptacle.

5. For use with an agricultural vehicular train including a baler having a discharge portion from which bales emerge along a defined path as the baler operates and a trailing vehicle including a bale-catching receptacle spaced and relatively remote from said discharge portion and an articulate draft connection to the baler to normally cause the receptacle to occupy a predetermined relationship to said discharge portion during straight-ahead travel of the baler and vehicle but enabling departure of the receptacle from said relationship during deviation of the baler and vehicle from straight-ahead travel; bale-handling mechanism disposed closely adjacent to said discharge portion and spaced from the receptacle for receiving a bale from said portion and for throwing such bale upwardly and outwardly through the air to the receptacle, said mechanism including bale-throwing means normally so aimed at the receptacle during said straight-ahead travel that the trajectory of the bale will be directly to the receptacle; support means exclusive of the receptacle and mounting the mechanism on the baler on a generally horizontal and fore-and-aft rocking axis spaced vertically from the throwing means for rocking of the mechanism so as to enable changes in the aiming of the throwing means; a power source in the train; power-operated adjusting means connected to said source and normally operative between the baler and mechanism for establishing the normal aim of the throwing means during straight-ahead travel; and control means operative on the adjusting means to rock the mechanism and thereby to correctively change the aim of the throwing means so as to accommodate the trajectory of the thrown bale to the changed position of the receptacle.

References Cited in the file of this patent

UNITED STATES PATENTS

| | | |
|---|---|---|
| 894,419 | Bennett et al. | July 28, 1908 |
| 1,718,460 | Hansen et al. | June 25, 1929 |
| 2,412,711 | Brewer | Dec. 17, 1946 |
| 2,585,169 | Potter | Feb. 12, 1952 |
| 2,827,154 | Forth et al. | Mar. 18, 1958 |
| 2,894,651 | Forth et al. | July 14, 1959 |
| 2,948,552 | Moon | Aug. 9, 1960 |
| 2,988,201 | Ludwig | June 13, 1961 |